Patented Aug. 1, 1944

2,354,713

UNITED STATES PATENT OFFICE 2,354,713

ART OF MAKING ACTIVATED CARBON

Alan C. Stoneman, Los Angeles, Calif.

No Drawing. Application March 10, 1942, Serial No. 434,048

12 Claims. (Cl. 252—283)

Recent efforts to produce activated carbons capable of meeting high specifications with respect to adsorptive activity and capacity, have met with difficulties, and in some instances limitations apparently rendering the problem incapable of solution from the standpoint of practicability in large-scale and quantity production. Particularly has this been true in the attempted production of highly activated carbon from certain relatively low density materials, namely, peach pits, apricot pits, and walnut shells.

In accordance with the present invention, it is now made possible to achieve large quantity production of highly adsorptive activated carbon from low density shell materials of the class mentioned. The accomplishments in this respect have been made possible boy the ascertainment of certain facts and considerations with relation to characteristics that must be possessed by the particles to be activated, and particularly the particles resulting from a preliminary charring operation, in order that such particles can by practicably expeditious methods be calcined (i. e. carbonized) to a state of activity as demanded, for example, in specifications for gas mask carbon.

In brief, the invention is predicated upon the determination that to be capable of calcination by ordinary methods to the necessary state of high adsorptive activity and capacity, the charred particles must have densities, or average densities, above the densities of considerable proportions of the particles found to be present in the charred shell materials commonly calcined for the production of activated carbon. Stated otherwise, to be convertible to a state of high activity of the order herein contemplated, a given particle must have a density considerably in excess of the densities of a substantial range of the lighter particles in the char mass, and for a product of maximum efficiency, its particle composition should be one of narrower density range confined more to the higher density values.

The potentially high adsorptive qualities of the product are seriously impaired by the presence therein of low density particles in considerable quantities. By selective removal of such particles it is possible to obtain a product having considerably greater adsorptive effectiveness than has heretofore been possible by the usual methods of producing activated carbon from shells of the type herein particularly dealt with. A process for such selective removal of low density particles, and the reasons and advantages underlying such process, are more fully treated in a companion application Serial No. 434,047, entitled Manufacture of activated carbon, and filed on even date herewith. In my companion application it is explained that although of the same size, different particles in the product may have widely differing adsorptive efficiencies, and that tests have established the fact that the lower efficiencies are possessed by the particles having lower densities. Consequently, the activity of the product may be increased to high levels of adsorptive capacity by selectively depleting it of particles within the lower density range.

The present invention contemplates a method whereby it is possible, in effect, to predetermine the adsorptive efficiency of the product by controlling the composition, as to particle densities, of the shell char to be activated. And as will appear, advantage may also be taken of an additional treatment given the product material to obtain increased ultimate activity, according to the method of application Serial No. 434,047. If the charred shell material be classified, prior to the activating calcination, to remove all particles whose densities come below a limit as later stated, then by calcination of the higher density material it is possible to obtain materially increased activity in the carbon product. The reason apparently is that the lower and higher density particles differ in their potential adsorptive activities or degrees of activation, at least when calcined under the same conditions, with the highest attainable activity being in favor of the higher density char particles. It is likely that because of their less dense structure, the lighter particles are inherently incapable, under conditions best suited to activation of the higher density particles, of affording, without excessive disintegration or loss of mass, a body structure or matrix that will accommodate the extensive pore formations and surface area essential to a highly activated form.

The invention may be further understood to better advantage by giving an explanation of a suitable process for the preparation of the char, and its subsequent calcination to make the activated product, it being understood that the details of the method of calcination are to be regarded merely as typical of various suitable methods.

The raw shell, which may have been left in coarse condition, or crushed to a fineness passing through a U. S. S. 4-mesh sieve and retained on a 10-mesh sieve, is subjected to preliminary calcination within a rotary kiln and in a substantially reducing atmosphere. The shell may be charred in the kiln at relatively low temperature, in the neighborhood of 1000° F., for about thirty minutes, producing a charred material having an average density (average of all its particles) of about 0.40. It is contemplated that a charred material suitable for the purposes of the invention and to be separated into relatively low and high density particles, may have an average density (average of all the particles)

ranging between, say, 0.35 and 0.52, with the densities of the individual particles ranging between 0.18 and 0.55. As herein used, the terms "density" and "specific gravity" are defined as the weight in grams per unit of volume of charcoal particles which will pass through a U. S. S. 12-mesh sieve, and are held on a U. S. S. 16-mesh sieve.

The charred material, sized for example to pass through a 10-mesh sieve and to be retained on a 12-mesh sieve, is subjected to a separating or classifying treatment, before activating calcination, to remove substantially all of the lower density particles within a predetermined range. As previously indicated, in a typical instance the densities of the particles may range between 0.18 and 0.55. To desirably precondition the char with respect to its density, the material is subjected to a suitable separating treatment to remove substantially all particles whose densities are lower than about 0.25, so that the mean or average density of the material to be activated will range between substantially 0.35 and 0.52. Any suitable method or apparatus may be employed for separating or classifying particles of the material in accordance with their differences in densities. It is preferred to use an air-type separator or classifier, many forms of which are known to those familiar with the art, in which the char particles are segregated by virtue of the action of one or more streams of air, with or without mechanical agitation. As a specific example, the char mass may be passed over a dry concentrator (e. g. the well-known Stebbins dry concentrator) in the form of a horizontally agitated table from which the different density portions are removed from different locations after segregation by upwardly jetted air streams. Particular attention is directed to the fact that the primary object of the separation is to segregate the particles according to differences in their densities, as distinguished from their sizes, and that density separation may occur between particles of exactly the same size.

The higher density portion of the separated char is subjected to calcination in a rotary kiln at a temperature between 1400 to 1850° F., over a period of time, say from four to twenty-four hours, depending upon the temperature of calcination, degree of activation desired in the product, and various possible modifying operating conditions. Calcination may occur in an atmosphere containing superheated steam or carbon dioxide, with or without complete exclusion of air. The effect of conducting the calcination in an oxygen-containing atmosphere, or at higher temperatures of calcination, is in general to increase the rate at which the carbon undergoes activation. Ordinarily this may occur to a degree rendering such expedients impracticable as a means of increasing the rate of production, because of excessive impairment of the desirable adsorptive properties of the product. However, by first separating the lower density particles from the char, as described, it is possible where maximum quantity production is of paramount concern, to employ more highly oxygenated atmospheres, or higher temperatures, in the calcining operation, and still obtain a product having properties of activation qualifying it for high specification purposes.

The activated product obtained by calcination of the char as described, typically may have a density ranging between 0.30 and 0.45, with a particle size corresponding to the mesh area of from 12 to 16 U. S. S. sieve. The activity of the carbon, determined by the usual carbon tetrachloride test, may range as high as from 14 to 20, and its heat of wetting as determined by the standard test, between about 8.5 to 11.0 per unit volume. If desired, the product thus obtained may be treated to meet extremely high specification with respect to adsorptive activity and capacity, by subjecting the product itself to segregation into relatively lower and higher density portions. As and for the reasons more fully dveloped in my companion application referred to above, a higher density portion of the product will be found to have a more highly activated state, as evidenced by increased values in heat of wetting and carbon tetrachloride activity tests thereon. As will be understood, the final segregation may occur at any point in the density range of the product, although as a general proportion, I prefer to exclude substantially all particles whose density falls below about 0.22.

In the foregoing, consideration has been given primarily to the problem of producing from a char of relatively low potential activation, a product material characterized by its high adsorptive activity. It may also be observed that the present type of process is applicable to the achievement of a somewhat different objective, and for purposes where the state of activation of the product may be of less or secondary importance. It is believed that the utility and efficiency of activated carbons for use in many industrial processes can greatly be enhanced by careful segregation out of the charred material stock to be calcined, and including particles of wide density range, a relatively narrow density range of particles which, upon calcination, will produce an activated product of correspondingly narrow density range. In any given instance, the density range of the particles of which the segregated product is composed, may be predetermined by proper classification of the char particles to be calcined, to meet the density requirements of a particular industrial process for which the activated product is to be used. Typically, such a product closely segregated with respect to the density range of its particles, may improve considerably the effectiveness of activated carbon for use in ore flotation processes.

I claim:
1. The method of making improved activated carbon from finely divided char comprising relatively low density and high density particles and produced by partial carbonization of carbonaceous material, that includes removing from said char relatively low density particles by separating the char particles in accordance with their relative densities, and thereby obtaining a higher density residual material, and subjecting said residual material to carbonization to produce an activated carbon product.

2. The method of making improved activated carbon from finely divided char comprising relatively low density and high density particles and produced by partial carbonization of carbonaceous material, that includes removing from said char relatively low density particles thereof by separating the char particles in a stream of air and in accordance with their relative densities, and thereby obtaining a higher density residual material and subjecting said residual material to carbonization to produce an activated carbon product.

3. The method of making improved activated carbon from finely divided char comprising relatively low density and high density particles and produced by partial carbonization of carbonaceous material, that includes removing from said char particles thereof having an average specific gravity below about 0.36 by separating the char particles in accordance with their relative densities, and thereby obtaining a higher density residual material and subjecting said residual material to carbonization to produce an activated carbon product.

4. The method of making improved activated carbon from finely divided char comprising relatively low density and high density particles and produced by partial carbonization of carbonaceous material, that includes removing from said char low density particles by separating the char particles in accordance with their relative densities, and thereby obtaining a higher density residual material, subjecting said residual material to carbonization to produce an activated carbon product, and variably controlling the average density of said residual material to control the density of said activated carbon product.

5. The method of making improved activated carbon from finely divided char comprising relatively low density and high density particles and produced by partial carbonization of carbonaceous shells, that includes removing from said char relatively low density particles by separating the char particles in accordance with their relative densities, and thereby obtaining a higher density residual material, and subjecting said residual material to carbonization to produce an activated carbon product having an adsorptive activity substantially in excess of the adsorptive activity of a product that would result from carbonization under the same conditions of said char without removal of said relatively low density particles.

6. The method of making improved activated carbon from finely divided char comprising relatively low density and high density particles and produced by partial carbonization of carbonaceous shells of the group consisting of peach pits, apricot pits, and walnuts; that includes removing from said char relatively low density particles by separating the char particles in accordance with their relative densities, and thereby obtaining a higher density residual material, and subjecting said residual material to carbonization to produce an activated carbon product.

7. The method of making improved activated carbon from finely divided char comprising relatively low density and high density particles and having an average specific gravity between 0.35 and 0.52 and produced by partial carbonization of carbonaceous shells of the group consisting of peach pits, apricot pits, and walnuts; that includes removing from said char relatively low density particles by separating the char particles in accordance with their relative densities, and thereby obtaining a higher density residual material, and subjecting said residual material to carbonization to produce an activated carbon product.

8. The method of making improved activated carbon from finely divided char comprising relatively low density and high density particles and having an average specific gravity between 0.35 and 0.52 and produced by partial carbonization of carbonaceous shells of the group consisting of peach pits, apricot pits, and walnuts; that includes removing from said char relatively low density particles by separating the char particles in accordance with their relative densities, and thereby obtaining a higher density residual material, and subjecting said residual material to carbonization to produce an activated carbon product having an average specific gravity between 0.30 and 0.45.

9. The method of making improved activated carbon from finely divided char comprising relatively low density and high density particles and having an average specific gravity between 0.35 and 0.52 and produced by partial carbonization of carbonaceous shells of the group consisting of peach pits, apricot pits, and walnuts; that includes removing from said char particles thereof having an average specific gravity below about 0.36 by separating the char particles in accordance with their relative densities, and thereby obtaining a higher density residual material, and subjecting said residual material to carbonization to produce an activated carbon product having an average specific gravity between 0.30 and 0.45.

10. The method of making improved activated carbon from finely divided char comprising relatively low density and high density particles and produced by partial carbonization of carbonaceous shells, that includes removing from said char relatively low density particles by separating the char particles in accordance with their relative densities, and thereby obtaining a higher density residual material, subjecting said residual material to carbonization to produce an activated carbon product, and separating from said product relatively low density particles thereof and thereby obtaining a residual final product of increased adsorptive activity.

11. The method of making improved activated carbon from finely divided char comprising relatively low density and high density particles and produced by partial carbonization of carbonaceous shells of the group consisting of peach pits, apricot pits, and walnuts; that includes removing from said char relatively low density particles by separating the char particles in accordance with their relative densities, and thereby obtaining a higher density residual material, subjecting said residual material to carbonization to produce an activated carbon product, and separating from said product relatively low density particles thereof and thereby obtaining a residual final product of increased adsorptive activity.

12. The method of making improved activated carbon from finely divided char comprising relatively low density and high density particles and produced by partial carbonization of carbonaceous shells of the group consisting of peach pits, apricot pits, and walnuts; that includes removing from said char relatively low density particles by separating the char particles in accordance with their relative densities, and thereby obtaining a higher density residual material, subjecting said residual material to carbonization to produce an activated carbon product, and separating from said product particles thereof having an average specific gravity under 0.22 and thereby obtaining a residual final product of increased adsorptive activity.

ALAN C. STONEMAN.